(12) United States Patent
Lesar et al.

(10) Patent No.: US 10,961,424 B2
(45) Date of Patent: Mar. 30, 2021

(54) LOWERING THE CRYSTALLIZATION TEMPERATURE OF BRINES

(71) Applicant: Halliburton Energy Services, Inc., Houston, TX (US)

(72) Inventors: Casey Timothy Lesar, Houston, TX (US); Hui Zhou, The Woodlands, TX (US); Chesnee Lae Davis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/486,495

(22) PCT Filed: Sep. 12, 2018

(86) PCT No.: PCT/US2018/050704
§ 371 (c)(1),
(2) Date: Aug. 15, 2019

(87) PCT Pub. No.: WO2019/168562
PCT Pub. Date: Sep. 6, 2019

(65) Prior Publication Data
US 2020/0362219 A1 Nov. 19, 2020

Related U.S. Application Data

(60) Provisional application No. 62/636,718, filed on Feb. 28, 2018.

(51) Int. Cl.
*C09K 8/32* (2006.01)
*C09K 8/05* (2006.01)
(Continued)

(52) U.S. Cl.
CPC ............... *C09K 8/032* (2013.01); *C09K 8/05* (2013.01); *C09K 8/845* (2013.01); *C09K 2208/32* (2013.01)

(58) Field of Classification Search
None
See application file for complete search history.

(56) References Cited

U.S. PATENT DOCUMENTS 5,643,858 A * 7/1997 Woolley ................. C09K 8/845
507/140
6,635,604 B1 10/2003 Halliday et al.
(Continued)

FOREIGN PATENT DOCUMENTS

WO 2017091660 6/2017
WO 2017151699 9/2017

OTHER PUBLICATIONS

ISRWO International Search Report and Written Opinion for PCT/US2018/050704 dated Apr. 11, 2019.

*Primary Examiner* — Jeffrey D Washville
(74) *Attorney, Agent, or Firm* — Tenley Krueger; C. Tumey Law Group PLLC

(57) ABSTRACT

Provided are compositions, methods, and systems that relate to use of crystallization temperature reduction additives in treatment fluids. A treatment fluid for use in subterranean operations, the treatment fluid comprising: a bromide brine having a first true crystallization temperature; a true crystallization temperature reduction additive, the first true crystallization temperature is the true crystallization temperature of the bromide brine without inclusion of the true crystallization temperature reduction additive; the treatment fluid has a second true crystallization temperature that is lower than the first true crystallization temperature. A method for treating a wellbore, wherein the method comprises: disposing a treatment fluid in the wellbore, wherein the treatment fluid comprises: a bromide brine and a first true crystallization temperature; a true crystallization temperature reduc- (Continued)

tion additive, the treatment fluid has a second true crystallization temperature that is lower than the first true crystallization temperature.

20 Claims, 2 Drawing Sheets

(51) Int. Cl.
*C09K 8/84* (2006.01)
*C09K 8/03* (2006.01)

(56) References Cited

U.S. PATENT DOCUMENTS

| | | |
|---|---|---|
| 2004/0059054 A1* | 3/2004 | Lopez .................. E21B 36/003 525/54.3 |
| 2006/0243449 A1 | 11/2006 | Welton et al. |
| 2009/0203554 A1 | 8/2009 | Monroe et al. |
| 2010/0326658 A1 | 12/2010 | Milne et al. |
| 2014/0144629 A1 | 5/2014 | Nguyen |
| 2014/0202695 A1* | 7/2014 | Suryawanshi ......... C09K 8/514 166/278 |
| 2017/0145284 A1 | 5/2017 | Davidson et al. |
| 2017/0292055 A1 | 10/2017 | Alleman |

* cited by examiner

LOWERING THE CRYSTALLIZATION TEMPERATURE OF BRINES

BACKGROUND

Brines may be used in subterranean operations for a number of functions. By way of example, treatments fluids used in drilling, completion, or workover operations may include a brine. In some instances, the use of high-density brines may be problematic. Traditional high-density, solids-free completion fluids have relied upon the use of zinc bromide or cesium formate brines, which may have environmental, technical, and economic limitations. While both zinc bromide and cesium formate brines may have high costs associated with them, zinc brines are also known to be environmentally hazardous. Calcium bromide brines may be prepared at densities greater than about 14.2 pounds per gallon ("lbs/gal") (1,700 kg/m$^3$) (up to about 15.5 lbs/gal (1,860 kg/m$^3$) and manganese bromide (II) brines may be prepared at densities greater than about 14.2 lbs/gal (1,700 kg/m$^3$) (up to about 17.0 lbs/gal (2,040 kg/m$^3$); but these brines may suffer from crystallization temperatures that are too high for some operations.

One type of brine that may be used in the treatments fluids includes a calcium bromide brine. However, it may be challenging to develop a low cost, zinc free completion fluid that may be based on calcium bromide that can achieve densities in the range of about 14.2 lbs/gal (1,700 kg/m$^3$) to about 17 lbs/gal (2,040 kg/m$^3$) without precipitation of the salt. The pressurized crystallization temperature (PCT) is the point where solids form in brine solutions under pressure. The effects of pressure can be significant in deep water applications and cold climates where the brines may crystallize at a temperature higher than the expected True Crystallization Temperature (TCT). Some negative effects due to crystallization may include, at very low temperatures, plugging of choke lines and kill lines. Additionally, at low temperatures, valves may seize. The removal of deposited crystals during pressure testing in locations of the wellbore where circulation may be poor may be extremely difficult and costly. Also, if crystals form at the surface, the density of the resulting brine may be lowered which may present difficulties in controlling the pressure downhole.

BRIEF DESCRIPTION OF THE DRAWINGS

These drawings illustrate certain aspects of some examples of the present invention, and should not be used to limit or define the invention.

DETAILED DESCRIPTION

Figure 1:
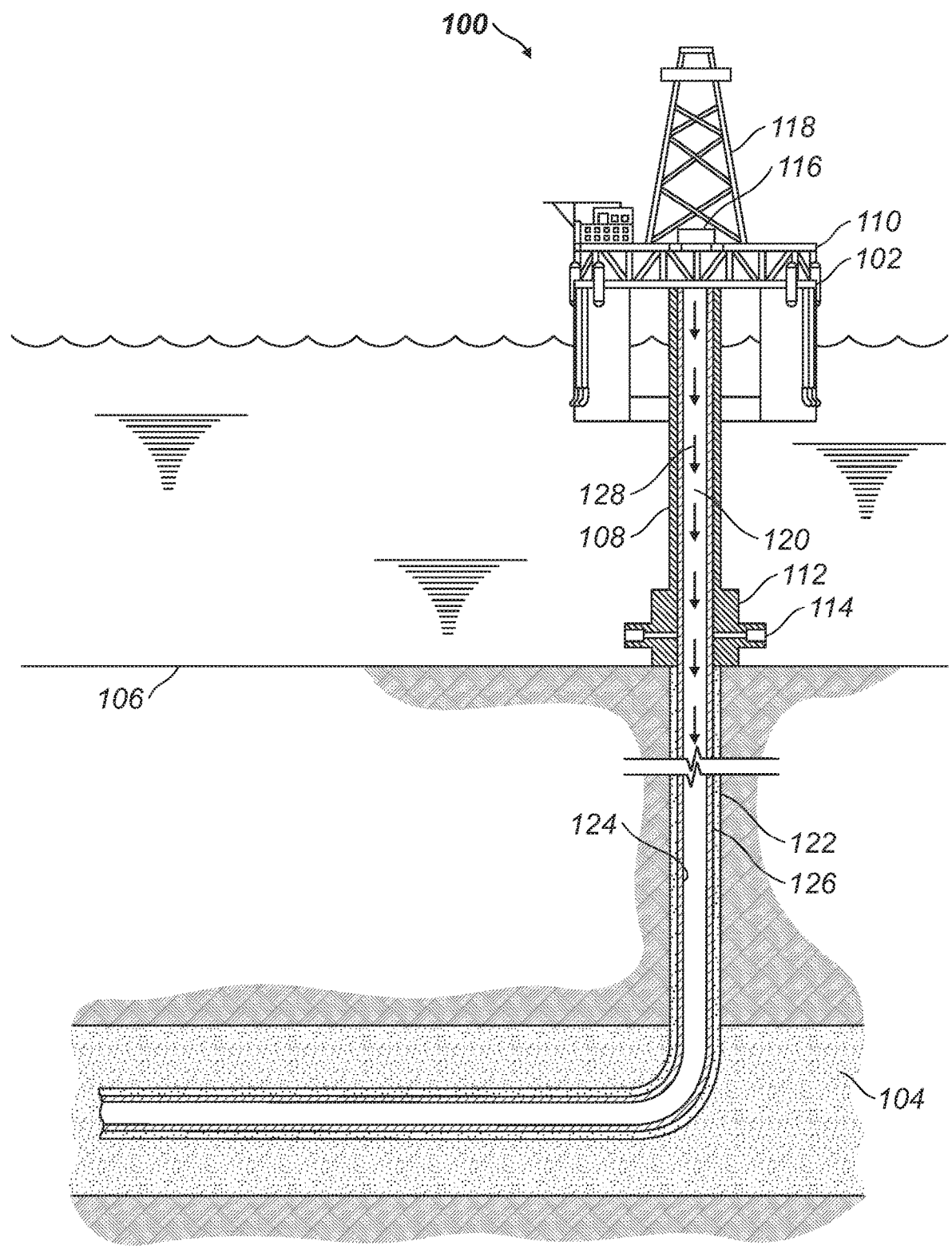
FIG. 1 illustrates placement of a treatment fluid into a wellbore in a subterranean operation.

Provided are compositions, methods, and systems for well treatment. More particularly, the present disclosure relates to compositions, methods, and systems for using true crystallization temperature reduction additives in treatment fluids that include a bromide brine. Advantageously, the true crystallization temperature reduction additive may reduce the true crystallization temperature of the bromide brine, thus enabling the use of higher density bromide brines than can be used without the true crystallization temperature reduction additive. Among other things, the high density brines that may be used are free or essentially free of zinc and cesium formate. The bromide brines may be considered essentially free of zinc and cesium formate if the brine includes zinc and cesium formate in an amount of about 1 wt. % based on the total weight of the brine or less.

Suitable bromide brines may be saturated or unsaturated as desired for a particular application. One or more salts may be added to water to provide a bromide brine that may include dissolved salt and water. Suitable dissolved salts may include any of a variety of bromide salts, including, but not limited to, lithium bromide, sodium bromide, potassium bromide, rubidium bromide, magnesium bromide, calcium bromide, cerium bromide, strontium bromide, zinc bromide, manganese (II) bromide, or any combinations thereof. In a non-limiting example, one salt may be used to prepare the brine. In some embodiments, multiple bromide salts may be used to prepare the bromide brine such that the bromide brine may be considered a single bromide brine, for example, including no additional salt or, if present, no more than about 1 wt. % based on the total weight of the bromide brine. In some examples, the brine may be free or essentially free of zinc and cesium formate.

The brine may be considered "high density." As used herein, the term "high density" refers to a brine with a density of about 14.2 lbs/gal (1,700 kg/m$^3$) or greater. Suitable brines may have a density at a point in range of from about 14.2 lbs/gal (1,700 kg/m$^3$) to about 17 lbs/gal (2,040 kg/m$^3$) or a density at a point in range of from about 14.2 lbs/gal (1,700 kg/m$^3$) to about 16 lbs/gal (1,920 kg/m$^3$). By way of example, the brine may have a density of about 14.2 lbs/gal, (1,700 kg/m$^3$) 14.5 lbs/gal (1,740 kg/m$^3$), 15 lbs/gal (1,800 kg/m$^3$), 16 lbs/gal (1,920 kg/m$^3$), 16.5 lbs/gal (1,980 kg/m$^3$), or 17 lbs/gal (2,040 kg/m$^3$).

The brine may be considered "solids free." As used herein the term "solids free" means that a fluid (e.g., the brine) is free of solids or, to the extent that solids are present, the solids are present in an amount of less than 100 parts per million. In some embodiments, a treatment fluid formulated with the brine may be solids free.

As previously described, a true crystallization temperature reduction additive may be included in the bromide brine. The true crystallization temperature reduction additive may disrupt the formation of a crystal structure in the bromide brines. Additionally, the true crystallization temperature reduction additive may be capable of enabling a bromide brine with a higher density in a liquid state. Any suitable true crystallization temperature reduction additive capable of lowering the crystallization temperature of treatment fluid may be used. In a non-limiting example, suitable crystallization temperature reduction additives may include, nitrates, such as magnesium nitrate, calcium nitrate, ammonium nitrate, glycols, sugar alcohols, cerium nitrate, malonamide, the like, and/or any combinations thereof. The true crystallization temperature reduction additive may be added to the brine in any suitable amount. Suitable amounts may include, but are not limited to, an amount ranging from about 1 wt. % to about 70 wt. % based on a total weight of the treatment fluid. Optionally, the crystallization temperature reduction additive may be added to the treatment fluid in an amount ranging from about 5 wt. % to about 50 wt. % based on a total weight of the treatment fluid, or, alternatively, ranging from about 10 wt. % to about 40 wt. % based on a total weight of the treatment fluid, or alternatively, ranging from about 1 wt. % to about 20 wt. % based on a total weight of the treatment fluid. For example, the true crystallization temperature reduction additive may be included in the treatment fluid in an amount of about 1 wt. %, about 5 wt.

%, about 10 wt. %, about 20 wt. %, about 30 wt. %, about 40 wt. %, about 50 wt. %, about 60 wt. %, or about 70 wt. % based on a total weight of the treatment fluid.

The bromide brine may have a true crystallization temperature. The crystallization temperature may generally refer to the temperature at which crystallized solids begin to form in a fluid that includes dissolved salts. The true crystallization temperature refers to the temperature corresponding to the maximum temperature reached following the super-cooling minimum, as determined using the methods described in the $5^{th}$ edition of the API Standards published in October 2014, under API RP 13J.

By inclusion of the true crystallization temperature additive in the bromide brine, the true crystallization temperature may be reduced. An example method of preparing a treatment fluid may include providing a bromide brine. The bromide brine may be obtained or prepared by dissolution of a bromide salt in water. The bromide brine may have a first true crystallization temperature. The bromide brine may have a density of about 14.2 lbs/gal (1,700 kg/m$^3$) or greater. A true crystallization temperature reduction additive, as previously described, may then be added to the bromide brine to form an aqueous composition having a second true crystallization temperature. The true crystallization temperature reduction additive may be added to the bromide brine in any suitable manner, including but not limited to, adding the bromide brine and the true crystallization temperature reduction additive to a mixer. Any suitable mixer may be used. In an embodiment, the true crystallization temperature reduction additive may be added to a mixing tank by way of a mixing hopper. The true crystallization temperature reduction additive may be added in bulk and/or in small packages. By addition of the true crystallization temperature reduction additive, the second true crystallization temperature may be less than the first true crystallization temperature. By way of example, the second temperature true crystallization temperature may be less than the first temperature true crystallization temperature by about 5° F. (3° C.), about 10° F. (6° C.), or even more. In one example, the second temperature true crystallization temperature may be less than the first temperature true crystallization temperature by about 55° F. (30° C.). The reduction in the true crystallization temperature by addition of the crystallization temperature reduction additive may depend on a number of factors, including, but not limited to, the type of bromide brine and true crystallization temperature reduction additive, as well as concentration of the true crystallization temperature reduction additive. If desired, additional salt may be added to the aqueous composition, after addition of the true crystallization temperature additive, such that the aqueous composition has an increased density as compared to the bromide brine. For example, salt may be added to increase the density by 5%, 10%, 20%, or even more. Increasing the density and lowering the true crystallization temperature of the bromide brine may provide many benefits for different applications downhole.

In an optional embodiment, the bromide brine may further include a glycol or a polyol. A glycol or a polyol may be added to the bromide brine to further reduce the true crystallization temperature of the treatment fluid. Any suitable glycol and polyol may be added, including, but not limited to, ethylene glycol, diethylene glycol, triethylene glycol, propylene glycol, butylene glycol, polyethylene glycol, polypropylene glycol, polyethylene-polypropylene glycol, glycerol, polyglycerol, trimethylolpropane, trimethylolethane, pentaerythritol, sugar alcohols, sugar acids, and combinations thereof. Glycol or polyol may be present in the treatment fluid in any suitable amount, including but not limited to, about 0.5% to about 50%, or about 1% to about 40%, or about 5% to about 30% by weight of the treatment fluid.

A wide variety of different treatments fluids may be prepared that include a bromide brine and a true crystallization temperature reduction additive. The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof. Additionally, a wide variety of optional additives may be included in the treatment fluid as should be appreciated by those of ordinary skill in the art with the benefit of this disclosure. Suitable additives may include, but are not limited to, a surfactant (e.g., foamer, defoamer, wetting agent, detergent, lubricant, and corrosion inhibitor), a water softener (e.g., sodium carbonate), an oxygen scavenger, a biocide, pH adjusters, fluid loss control agents, viscosity increasing agents, weighting agents (other than salt), a corrosion inhibitor (other than surfactant), inhibitor, the like, and/or any combination thereof. Optional additives may be added to the treatment fluid in any suitable amount as desired for a particular application.

The treatment fluid may further include a surfactant. Surfactants may be useful for a cleaning the oil-based residues. Any suitable surfactant may be used in the treatment fluid, including but not limited to, polysorbates, such as polysorbate 20, polysorbate 40, polysorbate 60, and polysorbate 80, ethoxylated alcohols, alkyl sulfonates, arylsulfonates, the like, and/or any combination thereof.

The treatment fluid may further include biocides. Biocides may be useful for killing microorganisms, especially bacteria, or interfere with their growth to prevent undesired growth downhole. Any suitable biocide may be used in the multi-functional diverting additive, including but not limited to, quaternary ammonium compounds, aldehydes, chlorine, hypochlorite solutions, and compounds like sodium dichloro-s-triazinetrione. An example of a biocide that may be used in subterranean applications is glutaraldehyde.

The treatment fluid may further include defoamers. Defoamers may be useful for preventing the undesired gas entrainment in fluids. Any suitable defoamer may be used in the treatment fluid, including but not limited to, polyol silicone compounds, alcohols, and/or any combination thereof.

The treatment fluid may further include corrosion inhibitors. Corrosion inhibitors may be useful for preventing or slowing the corrosion of equipment used downhole. Any suitable corrosion inhibitor may be used in the treatment fluid, including but not limited to, acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, formamides, erythorbates, amines, combinations of such compounds used in conjunction with iodine, quaternary ammonium compounds, and/or any combination thereof.

The treatment fluid may further include a pH modifier. A pH modifier may be used to help maintain the treatment fluid at a neutral or basic pH which may help minimize the amount of corrosion in the system. Any suitable pH modifier may be used in the treatment fluid, including but not limited to, sodium hydroxide, potassium hydroxide, magnesium oxide, hydrated lime, unhydrated lime, acetic acid, other weak acids, other strong acids, other weak bases, other strong bases, and/or any combination thereof.

The treatments fluids may be used in a variety of different subterranean applications. In some examples, a treatment fluid that includes a bromide brine and a true crystallization temperature reduction additive may be introduced into a wellbore. The wellbore may penetrate one or more subterranean formations. In some examples, the treatment fluid may be used as a completion fluid. A completion fluid may be used, for example, to minimize damage to the hydrocarbon-containing reservoir when completing the well. In some embodiments, the completion fluid may be solids free. The completion fluid may be placed into the wellbore after drilling, for example, when transitioning to completion of the wellbore. By way of example, the completion fluid may displace the drilling fluid from the wellbore. In some embodiments, the completion fluid may be placed into the production tubing to displace drilling fluid from the production tubing such that the drilling fluid return to the surface through the annulus between the production tubing and casing. The completion fluid may be placed into the wellbore prior to initiation of production, for example, to minimize reservoir damage and control formation pressure. The completion fluid may be placed into the wellbore and allowed to remain in the wellbore during completion. For example, the completion fluid may be present in the wellbore when production equipment, such as production liners, downhole valves, and packers, placed into the wellbore in the completion fluid.

FIG. 1 illustrates an example of a downhole completion system 100 operating from a platform 102. Platform 102 may be centered over a subterranean formation 104 located below the surface 106. A conduit 108 may extend from deck 110 of platform 102 to wellhead installation 112 including blow-out preventers 114. Platform 102 may have a hoisting apparatus 116 and a derrick 118 for raising and lowering pipe strings, such as, for example, work string 120 into and out of wellbore 122. Wellbore 122 may extend through the various earth strata including subterranean formation 104. Work string 120, may be any suitable conveyance, including but not limited to, a tubing string, wireline, slick line, coil tubing, the like, and/or any combination thereof. A casing 124 may be cemented within wellbore 122 by cement 126. At a desired time, treatment fluid 128 may be introduced in wellbore 122 and may aid in the completion of a well. In some embodiments, treatment fluid 128 may be introduced into wellbore 122 through work string 120. Treatment fluid 128 may be any suitable treatment fluid disclosed herein. Any suitable well completion operation may be performed on wellbore 122, including but not limited to, casing, cementing, perforating, gravel packing, packers, fracturing, the like, and/or any combination thereof. It should be noted that treatment fluid 128 may be used in any suitable well completion application and should not be limited to the applications herein. In a non-limiting embodiment, treatment fluid 128 may be disposed in well bore when one or more downhole tool (e.g., production equipment) are run into wellbore 122. In some embodiments, work string 120 may be in the form a production tubing with treatment fluid 128 placed into work string 120 to replace a drilling fluid (or another fluid) previously disposed in production tubing. It should be noted that while FIG. 1 generally depicts a subsea operation, those skilled in the art will readily recognize that the principles described herein are equally applicable to land-based systems, without departing from the scope of the disclosure.

Accordingly, this disclosure describes systems, compositions, and methods that may use a treatment fluid including a bromide brine and a true crystallization temperature reduction additive to treat a wellbore. Without limitation, the systems, compositions, and methods may include any of the following statements:

Statement 1: A treatment fluid for use in subterranean operations, the treatment fluid comprising: a bromide brine having a first true crystallization temperature, wherein the bromide brine has a density of about 14.2 lbs/gal or greater; and a true crystallization temperature reduction additive, wherein the first true crystallization temperature is the true crystallization temperature of the bromide brine without inclusion of the true crystallization temperature reduction additive; and wherein the treatment fluid has a second true crystallization temperature that is lower than the first true crystallization temperature.

Statement 2: The treatment fluid of statement 1, wherein the second true crystallization temperature is less than the first true crystallization temperature by about 9° F. or more.

Statement 3: The treatment fluid of statement 1 or 2, wherein the bromide brine comprises at least one brine selected from the group consisting of a lithium bromide, sodium bromide, potassium bromide, rubidium bromide, magnesium bromide, calcium bromide, cerium bromide, strontium bromide, zinc bromide, manganese (II) bromide, a manganese (II) brine, and any combination thereof.

Statement 4: The treatment fluid of any one of the preceding statements, wherein the true crystallization temperature reduction additive comprises at least one additive selected from the group consisting of lithium nitrate, magnesium nitrate, calcium nitrate, ammonium nitrate, strontium nitrate, and any combination thereof.

Statement 5: The treatment fluid of any one of the preceding statements, further comprising a polyol in an amount of about 1 wt. % to about 20 wt. % based on a total weight of the treatment fluid.

Statement 6: The treatment fluid of any one of the preceding statements, wherein the bromide brine is free or essentially free of zinc and cesium formate.

Statement 7: The treatment fluid of any one of the preceding statements, further comprising at least one additional additive selected from the group consisting of a corrosion inhibitor, a pH modifier, a biocide, and any combination thereof.

Statement 8: The treatment fluid of any one of the preceding statements, wherein true crystallization temperature reduction additive comprises a nitrate in an amount of about 1 wt. % to about 70 wt. % based on a total weight of the treatment fluid.

Statement 9: A method for treating a wellbore, wherein the method comprises: disposing a treatment fluid in the wellbore, wherein the treatment fluid comprises: a bromide brine having a density of about 14.2 lbs/gal or greater and a first true crystallization temperature; and a true crystallization temperature reduction additive, wherein the first true crystallization temperature is the true crystallization temperature of the bromide brine without inclusion of the true crystallization temperature reduction additive; and wherein the treatment fluid has a second true crystallization temperature that is lower than the first true crystallization temperature.

Statement 10: The method of statement 9, wherein the second true crystallization temperature is lower than the first true crystallization temperature by about 9° F. or more.

Statement 11: The method of statement 9 or 10, wherein the bromide brine comprises at least one brine selected from the group consisting of a lithium bromide, sodium bromide, potassium bromide, rubidium bromide, magnesium bromide, calcium bromide, cerium bromide, strontium bromide, zinc bromide, manganese (II) bromide, a manganese (II) brine, and any combination thereof.

Statement 12: The method of any one of statements 9 to 11, wherein true crystallization temperature reduction additive comprises at least one additive selected from the group consisting of lithium nitrate, magnesium nitrate, calcium nitrate, ammonium nitrate, strontium nitrate, and any combination thereof.

Statement 13: The method of any one of statements 9 to 12, wherein the treatment fluid further comprises a polyol in an amount of about 1 wt. %. to about 20 wt. % based on a total weight of the treatment fluid.

Statement 14: The method of any one of statements 9 to 13, further comprising running a downhole tool into the treatment fluid in the wellbore.

Statement 15: The method of any one of statements 9 to 14, further comprising replacing a drilling fluid disposed in a production tubing disposed in the wellbore with the treatment fluid.

Statement 16: The method of any one of statements 9 to 15, wherein the treatment fluid is solids free.

Statement 17: The method of any one of statements 9 to 16, further comprising adding the true crystallization temperature reduction additive to the bromide brine to form an aqueous composition such that the true crystallization temperature of the aqueous composition is less than the first true crystallization temperature by at least about 9° F. or more, wherein the bromide brine comprises calcium bromide, wherein the true crystallization temperature reduction additive comprises a nitrate, and wherein the treatment fluid is solids free.

Statement 18: A method of lowering crystallization temperature, comprising: providing a bromide brine having a first true crystallization temperature, wherein the bromide brine has a density of about 14.2 lbs/gal or greater; and adding a true crystallization temperature reduction additive to the bromide brine to form an aqueous composition having a second true crystallization temperature, wherein the first true crystallization temperature is the true crystallization temperature of the bromide brine without inclusion of the true crystallization temperature reduction additive; and wherein the aqueous composition has a second true crystallization temperature that is lower than the first true crystallization temperature.

Statement 19: The method of statement 18, further comprising adding additional bromide salt to the aqueous composition to increase a density of the aqueous composition.

Statement 20: The method of statement 18 or 19, wherein the bromide brine comprises at least one brine selected from the group consisting of a lithium bromide, sodium bromide, potassium bromide, rubidium bromide, magnesium bromide, calcium bromide, cerium bromide, strontium bromide, zinc bromide, manganese (II) bromide, a manganese (II) brine, and any combination thereof, and wherein the true crystallization temperature reduction additive comprises at least one additive selected from the group consisting of lithium nitrate, magnesium nitrate, calcium nitrate, ammonium nitrate, strontium nitrate, and any combination thereof.

To facilitate a better understanding of the present disclosure, the following examples of certain aspects of some of the systems and methods are given. In no way should the following examples be read to limit, or define, the entire scope of the disclosure.

Example 1

Several brines that include different amounts of a true crystallization temperature additive were tested to determine the effect of the true crystallization temperature reduction additive on the true crystallization temperature (TCT) and pressurized crystallization temperature (PCT) of a bromide brine. These tests were done in accordance with the methods of the 5$^{th}$ edition of the API Standards published in October 2014, under API RP 13J. This method was slightly modified to incorporate the use of a pressurized cell. The use of a pressurized cell enabled the crystallization point to be measured of a pressure range of about 0 psi to about 20,000 psi. The bromide brine was a calcium bromide brine with a density of about 14.8 lb/gal (1,770 kg/m$^3$). The true crystallization temperature reduction additive was calcium nitrate. The concentration of the true crystallization temperature reduction additive included in the calcium bromide brine was 13.5 wt. %, 15.7 wt. %, and 17.5 wt. % based on a total weight of the calcium bromide brine. A comparative test was also performed that did not include the true crystallization temperature reduction additive. The results from the tests based on modified methods of API RP 13J are depicted below in Table 1 and graphically in FIG. 2.

TABLE 1

| Test | Amount of Ca(NO$_3$)$_2$ (wt. %) | Temp. at 15 psi | Temp. at 5,000 psi | Temp. at 10,000 psi | Temp. at 15,000 psi | Temp. at 20,000 psi |
|---|---|---|---|---|---|---|
| Blank | 0 | 50° F. (10° C.) | 58° F. (14° C.) | 65° F. (18° C.) | 72° F. (22° C.) | 80° F. (27° C.) |
| A | 13.5 | 1° F. (−17° C.) | 11° F. (−12° C.) | 20° F. (−7° C.) | 27° F. (−3° C.) | 36° F. (2° C.) |
| B | 15.7 | −4° F. (−20° C.) | 3° F. (−16° C.) | 11° F. (−12° C.) | 20° F. (−7° C.) | 27° F. (−3° C.) |
| C | 17.5 | — | — | — | — | 13° F. (−11° C.) |

Figure 2:
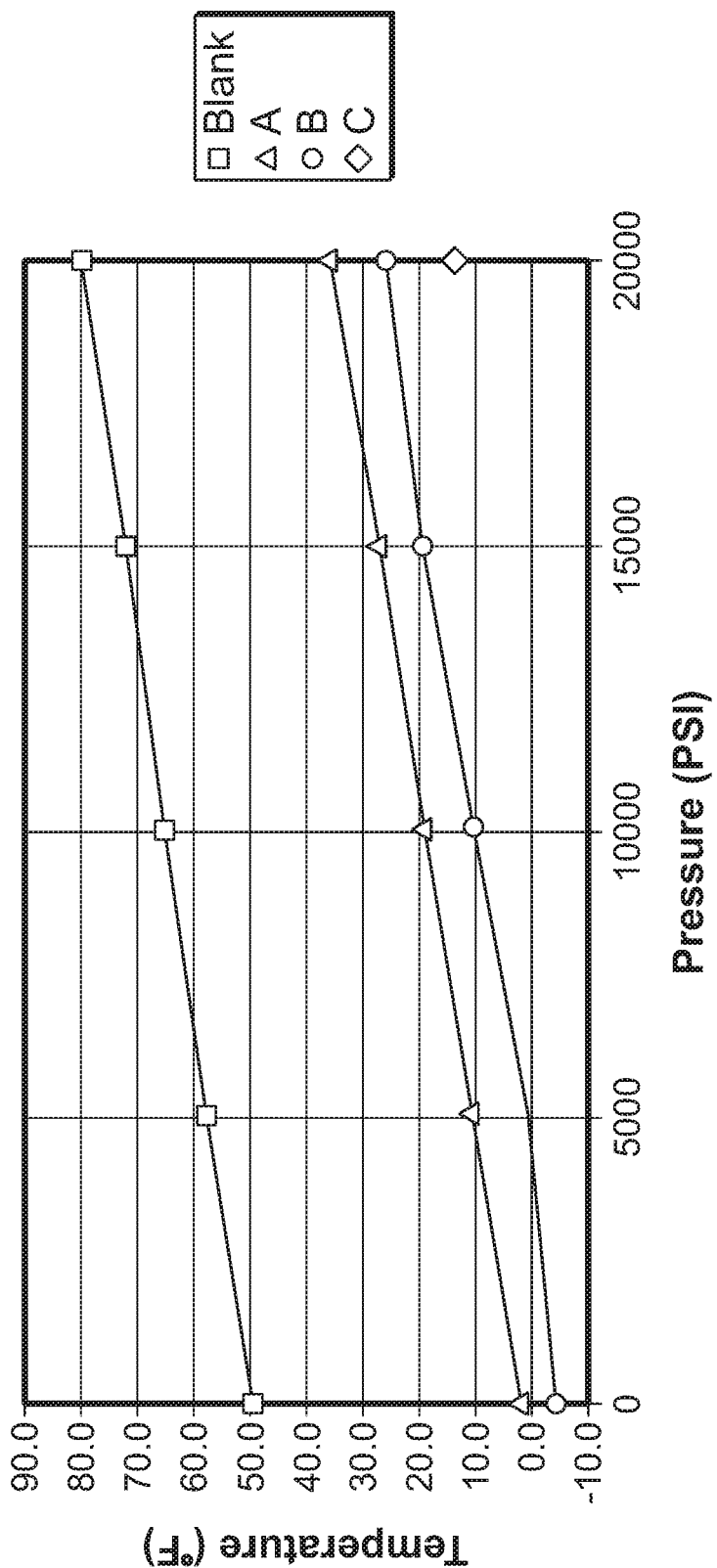
FIG. 2 is a graph representing pressurized crystallization temperature data for a calcium bromide brine with calcium nitrate with a density of 14.8 lbs/gal (1,770 kg/m$^3$).

Table 1 and FIG. 2 may show that as the pressure increases and the amount of true crystallization temperature reduction additive added to the treatment fluid increases, the true crystallization temperature of the treatment fluid may decrease. The TCT is the crystallization temperature at a pressure of 15 psi. The PCT is the crystallization temperature under a given pressure.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A treatment fluid for use in subterranean operations, the treatment fluid comprising:
    a bromide brine having a first true crystallization temperature, wherein the bromide brine has a density of about 14.2 lbs/gal or greater; and
    a true crystallization temperature reduction additive comprising a nitrate in an amount of about 1 wt % to about 70 wt % based on a total weight of the treatment fluid;
    wherein the first true crystallization temperature is the true crystallization temperature of the bromide brine without inclusion of the true crystallization temperature reduction additive;
    wherein the treatment fluid has a second true crystallization temperature that is lower than the first true crystallization temperature, and
    wherein the bromide brine is free or essentially free of zinc and cesium formate.

2. The treatment fluid of claim 1, wherein the second true crystallization temperature is less than the first true crystallization temperature by about 9° F. or more.

3. The treatment fluid of claim 1, wherein the bromide brine comprises at least one brine selected from the group consisting of a lithium bromide, sodium bromide, potassium bromide, rubidium bromide, magnesium bromide, calcium bromide, cerium bromide, strontium bromide, manganese (II) bromide, a manganese (II) brine, and any combination thereof.

4. The treatment fluid of claim 1, wherein the true crystallization temperature reduction additive comprises at least one additive selected from the group consisting of lithium nitrate, magnesium nitrate, calcium nitrate, ammonium nitrate, strontium nitrate, and any combination thereof.

5. The treatment fluid of claim 1, further comprising a polyol in an amount of about 1 wt. % to about 20 wt. % based on a total weight of the treatment fluid.

6. The treatment fluid of claim 1, further comprising at least one additional additive selected from the group consisting of a corrosion inhibitor, a pH modifier, a biocide, and any combination thereof.

7. A method for treating a wellbore, wherein the method comprises:
    disposing a treatment fluid in the wellbore, wherein the treatment fluid comprises:
        a bromide brine having a density of about 14.2 lbs/gal or greater and a first true crystallization temperature; and
        a true crystallization temperature reduction additive comprising a nitrate in an amount of about 1 wt % to about 70 wt % based on a total weight of the treatment fluid,
        wherein the first true crystallization temperature is the true crystallization temperature of the bromide brine without inclusion of the true crystallization temperature reduction additive;
        wherein the treatment fluid has a second true crystallization temperature that is lower than the first true crystallization temperature, and
        wherein the bromide brine is free or essentially free of zinc and cesium formate.

8. The method of claim 7, wherein the second true crystallization temperature is lower than the first true crystallization temperature by about 9° F. or more.

9. The method of claim 7, wherein the bromide brine comprises at least one brine selected from the group consisting of a lithium bromide, sodium bromide, potassium bromide, rubidium bromide, magnesium bromide, calcium bromide, cerium bromide, strontium bromide, manganese (II) bromide, a manganese (II) brine, and any combination thereof.

10. The method of claim 7, wherein true crystallization temperature reduction additive comprises at least one additive selected from the group consisting of lithium nitrate, magnesium nitrate, calcium nitrate, ammonium nitrate, strontium nitrate, and any combination thereof.

11. The method of claim 7, wherein the treatment fluid further comprises a polyol in an amount of about 1 wt. % to about 20 wt. % based on a total weight of the treatment fluid.

12. The method of claim 7, further comprising running a downhole tool into the treatment fluid in the wellbore.

13. The method of claim 7, further comprising replacing a drilling fluid disposed in a production tubing disposed in the wellbore with the treatment fluid.

14. The method of claim 7, wherein the treatment fluid is solids free.

15. The method of claim 7, further comprising adding the true crystallization temperature reduction additive to the bromide brine to form an aqueous composition such that the true crystallization temperature of the aqueous composition is less than the first true crystallization temperature by at least about 9° F. or more, wherein the bromide brine comprises calcium bromide, wherein the true crystallization temperature reduction additive comprises a nitrate, and wherein the treatment fluid is solids free.

16. A method of lowering crystallization temperature, comprising:
providing a bromide brine having a first true crystallization temperature, wherein the bromide brine has a density of about 14.2 lbs/gal or greater; and
adding a true crystallization temperature reduction additive to the bromide brine to form an aqueous composition having a second true crystallization temperature,
wherein the first true crystallization temperature is the true crystallization temperature of the bromide brine without inclusion of the true crystallization temperature reduction additive;
wherein the aqueous composition has a second true crystallization temperature that is lower than the first true crystallization temperature,
wherein the bromide brine is free or essentially free of zinc and cesium formate, and
wherein the true crystallization temperature reduction additive comprises a nitrate in an amount of about 1 wt % to about 70 wt % based on a total weight of the treatment fluid.

17. The method of claim 16, further comprising adding additional bromide salt to the aqueous composition to increase a density of the aqueous composition.

18. The method of claim 16, wherein the bromide brine comprises at least one brine selected from the group consisting of a lithium bromide, sodium bromide, potassium bromide, rubidium bromide, magnesium bromide, calcium bromide, cerium bromide, strontium bromide, manganese (II) bromide, a manganese (II) brine, and any combination thereof, and wherein the true crystallization temperature reduction additive comprises at least one additive selected from the group consisting of lithium nitrate, magnesium nitrate, calcium nitrate, ammonium nitrate, strontium nitrate, and any combination thereof.

19. The treatment fluid of claim 1, wherein the nitrate is present in an amount of about 10 wt % to about 40 wt % based on a total weight of the treatment fluid.

20. The method of claim 16, wherein the nitrate is present in an amount of about 10 wt % to about 40 wt % based on a total weight of the treatment fluid.

* * * * *